United States Patent [19]

Gagnon

[11] Patent Number: 4,496,286
[45] Date of Patent: Jan. 29, 1985

[54] CONTROL SYSTEM FOR ENGINE-DRIVEN COMPRESSOR UNIT AND METHOD OF OPERATION THEREOF

[75] Inventor: James J. Gagnon, Spring, Tex.

[73] Assignee: J-W Operating Company, Dallas, Tex.

[21] Appl. No.: 514,411

[22] Filed: Jul. 18, 1983

[51] Int. Cl.³ ............... F02B 37/12; F02D 19/00; F02D 23/02; F04B 35/00
[52] U.S. Cl. .................. 417/22; 60/603; 73/862.35; 123/275; 123/486; 123/417; 123/528; 417/34; 417/274
[58] Field of Search ............ 60/600, 601, 602, 603; 123/275, 478, 486, 487; 417/274, 34, 22, 364; 73/862.19, 862.35

[56] References Cited

U.S. PATENT DOCUMENTS

| | | | |
|---|---|---|---|
| 1,998,265 | 4/1935 | Aikman | 417/34 |
| 3,443,376 | 5/1969 | Light | 60/602 |
| 3,508,530 | 4/1970 | Clawson | 123/275 |
| 3,717,029 | 2/1973 | Trefer | 73/862.35 X |
| 4,368,705 | 1/1983 | Stevenson et al. | 123/486 X |

Primary Examiner—Michael Koczo
Attorney, Agent, or Firm—Drude Faulconer

[57] ABSTRACT

A control system for a compressor unit driven by a clean-burn, turbo-charged, gas-fueled engine which is primarily responsive to the load (torque) and the speed of the engine to adjust certain engine parameters to maintain the operating conditions of the engine within a desirable operating zone which is a compromise or "trade-off" between best fuel economy and permissible exhaust emission levels. A number of "maps" which correlate load (torque) at various speeds with specific fuel consumption and exhaust emissions are derived from available manufacturer's data and are programmed into a central processing unit (CPU). The actual speed and load of the engine are continuously monitored and signals representative thereof are inputed into the CPU to select the proper map and to output control signals therefrom to adjust the ignition timing, the waste gate (air chest pressure) and the fuel pressure to the prechambers of the engine to their respective desired positions which, in turn, will provide the desired engine operation at the sensed speed and load conditions. The operation can be "fine-tuned" within the selected zone of operation through the use of other measured engine parameters.

8 Claims, 14 Drawing Figures

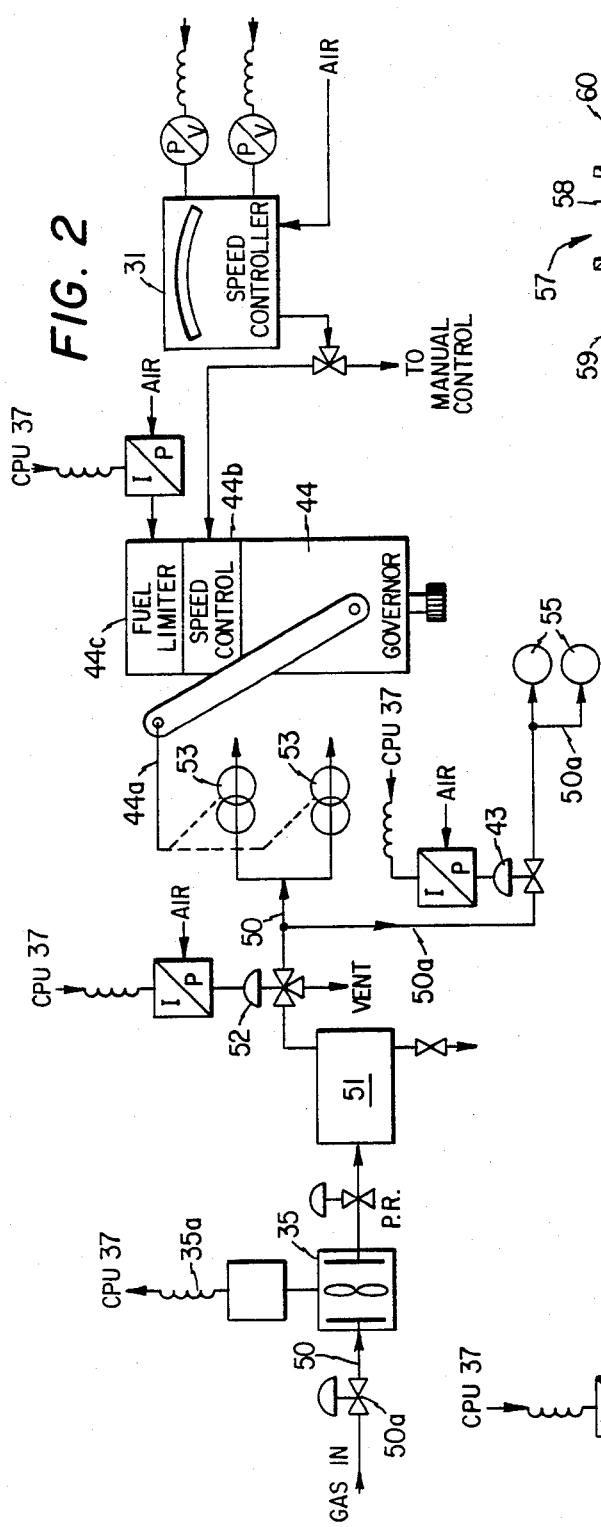
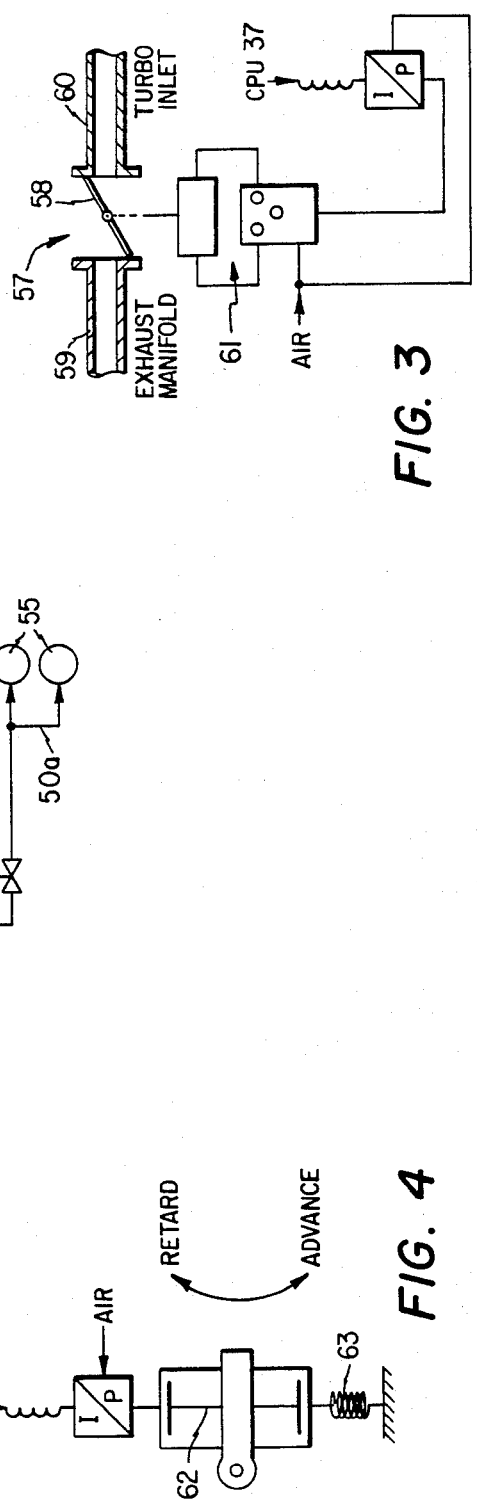
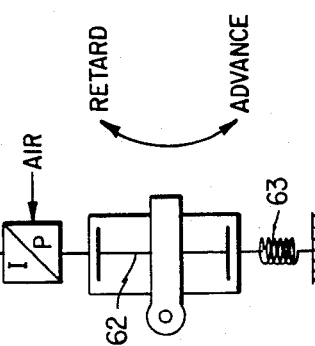
FIG. 2
FIG. 3
FIG. 4

100% LOAD

—·— EXTRAPOLATED NOX

75% LOAD

50% LOAD

CONTROL SYSTEM FOR ENGINE-DRIVEN COMPRESSOR UNIT AND METHOD OF OPERATION THEREOF

DESCRIPTION

1. Technical Field

The present invention relates to a control system for an engine-driven compressor unit and more particularly relates to a control system which is primarily responsive to the speed and/or the torque of an engine to maintain an acceptable fuel efficiency for the engine while maintaining undesirable emissions in the exhaust at acceptable levels.

2. Background Art

Packaged engine-driven compressor units are commonly used in the natural gas gathering and pipeline industry. A typical unit is comprised of a large, positive-displacement compressor which is driven by a dedicated, multi-cylinder, clean-burn, turbo-charged engine which, in turn, is fueled by natural gas. In the past, natural gas was plentiful and cheap so little consideration was given to the fuel efficiency of these engines. However, recent economic and conservation developments have made fuel efficiency a primary concern in the commercial design and engineering of these units.

If fuel efficiency were the only concern, an engine of this type could merely be controlled to always operate at its best fuel efficiency for the speed and load at which the engine is operating at the time. However, recent concern with the environment prohibits this simplified approach. The U.S. Environmental Protection Agency (E.P.A.) has now set standards for the amounts of undesirable emissions, i.e. nitrogen oxide (NOX), which can be exhausted from engines of this type without the need for special permits.

Generally speaking, exhaust emissions are greatest at temperature exposures in length of time and temperatures above 2200° F. in the combustion chamber and is not specifically related to any one speed or load [Brake Mean Effective Pressure (BMEP)], all being continually affected by the environment of the engine and its peculiarities.

The rate of response is also very important to load acceptance. How this can be improved depends largely on the ignition timing. However, ignition timing has a direct effect on the exhaust emissions and fuel economy of the engine. Retarded ignition improves load acceptance by imparting more energy into the exhaust system to increase turbocharger efficiency (air chest pressure) thus allowing for rapid increase in load acceptance. This also reduces the exhaust's exposure to temperatures within the combustion chamber thereby reducing exhaust emission levels. However, this adversely affects the engine's fuel economy by increasing the fuel rate in terms of brake specific fuel consumption.

The E.P.A. standards for exhaust emissions mentioned above are based on the total NOX emissions that an engine exhausts at its maximum rated horsepower at maximum speed. Since, due to the changing demands normally encountered by an engine during normal operation, the engine is seldom operated under these maximum conditions for any prolonged length of time. Therefore, it is desirable to control the engine over its entire operational range to provide the best fuel efficiency for each particular speed and load condition which will, at the same time, maintain the exhaust emissions within the permissible E.P.A. standards at that speed and load.

Previous control systems for engines of this type have attempted to provide the desirable control through the use of a speed governor and data which is theoretically derived from various known relationships between certain engine parameters at varying speeds. For example, the fuel pressure for an engine may be plotted against the air manifold pressure of the engine for varying speeds to thereby develop a data curve from which the fuel pressure of the engine can be adjusted in response to the continuously monitored air manifold pressure. However, such systems have proved to be lacking in that several important engine parameters, load of the engine, cannot be considered, i.e., load of the engine cannot be considered accurate because of varying parameters such as fuel heat value, temperature, mechanical malfunctions and wear. This may be due to the fact that, heretofore, there was no practical known way of providing a continuous, accurate measurement of load during operation of the engine and therefore load could not be used as a control parameter for the engine. Also, such previous control systems routinely fail to consider other important factors; e.g. the actual BTU value of the fuel, the ambient conditions of the air, etc., all of which may change from time to time during operation.

DISCLOSURE OF THE INVENTION

The present invention provides a control system for an engine of an engine-driven compressor unit which is primarily responsive to the speed and/or the load on the engine. Load is determined directly from the torque which is being developed in a flexible coupling which connects the drive shaft of the engine to the driven shaft of the compressor. The torque is continuously measured and since load is directly related to the torque and the engine displacement (the latter being a known constant for a particular engine), the signal representative of the torque can easily be shaped to give a direct reading of load.

Signals representative of the speed and torque of the engine are fed to a control signal storage means which responds to these input signals to output predetermined control signals which, in turn, adjust various operating parameters of the engine. The control signal storage means comprise sets of "maps" which are derived from test data which is available from the manufacturer of the engine. The "maps" are stored in a central processing unit (CPU). Specifically, in one set of maps, the fuel efficiency and the NOX emissions of an engine are plotted at varying speeds and loads of the engine to establish operational zones at those speeds and loads within which the engine may operate to achieve an acceptable "trade-off" between best fuel efficiency and NOX emissions. A second set of maps include a plurality of individual maps, each of which represents a particular speed (e.g. 900 rpms) and a particular load (e.g. 100%) at that particular speed on which is plotted predetermined desired settings for engine ignition timing and waste gate positon in relation to specific fuel consumption (i.e. different BTU values of fuel) and varying NOX emissions at said particular speed and load. A third map plots the specific fuel consumption and exhaust temperature against the engine's air chest pressure and predetermined settings of the fuel pressure for the prechambers of the engine. A fourth map uses the speed of the engine and the suction pressure of the compressor to control the capacity (throughput) of the compressor.

In operation, the known BTU value of the fuel is encoded into the CPU. Both the speed and the load (torque) are continuously measured and signals representative thereof are supplied to CPU where they select the map for that particular speed and load and locate a point within the operational zone on said map to output signals to adjust the ignition timing and waste gate (the latter controls the air chest pressure) of the engine to predetermine positions which allow the engine to operate at desired conditions. Also, the air chest pressure is used to output a signal to adjust the prechamber fuel pressure to a predetermined value which will insure proper combustion under the conditions the engine is then operating.

The present control system also allows for "fine-tuning" the engine's operations within a selected operational zone by utilizing ambient air conditions with the air chest, exhaust temperature, etc. Also, the system provides safety start-up and shut-down procedures to insure that the engine-driven unit will cease operation if unsafe conditions arise.

BREIF DESCRIPTION OF THE DRAWINGS

The actual construction, operation, and apparent advantages of the present invention will be better understood by referring to the drawings in which like numerals identify like parts and in which:

FIG. 2 is a schematical view of the fuel system for the unit of FIG. 1;

FIG. 3 is a schematical view of the waste gate and control therefor for the unit of FIG. 1;

FIG. 4 is a schematical view of the ignition adjust means for the unit of FIG. 1;

BEST MODE FOR CARRYING OUT THE INVENTION

Figure 1:
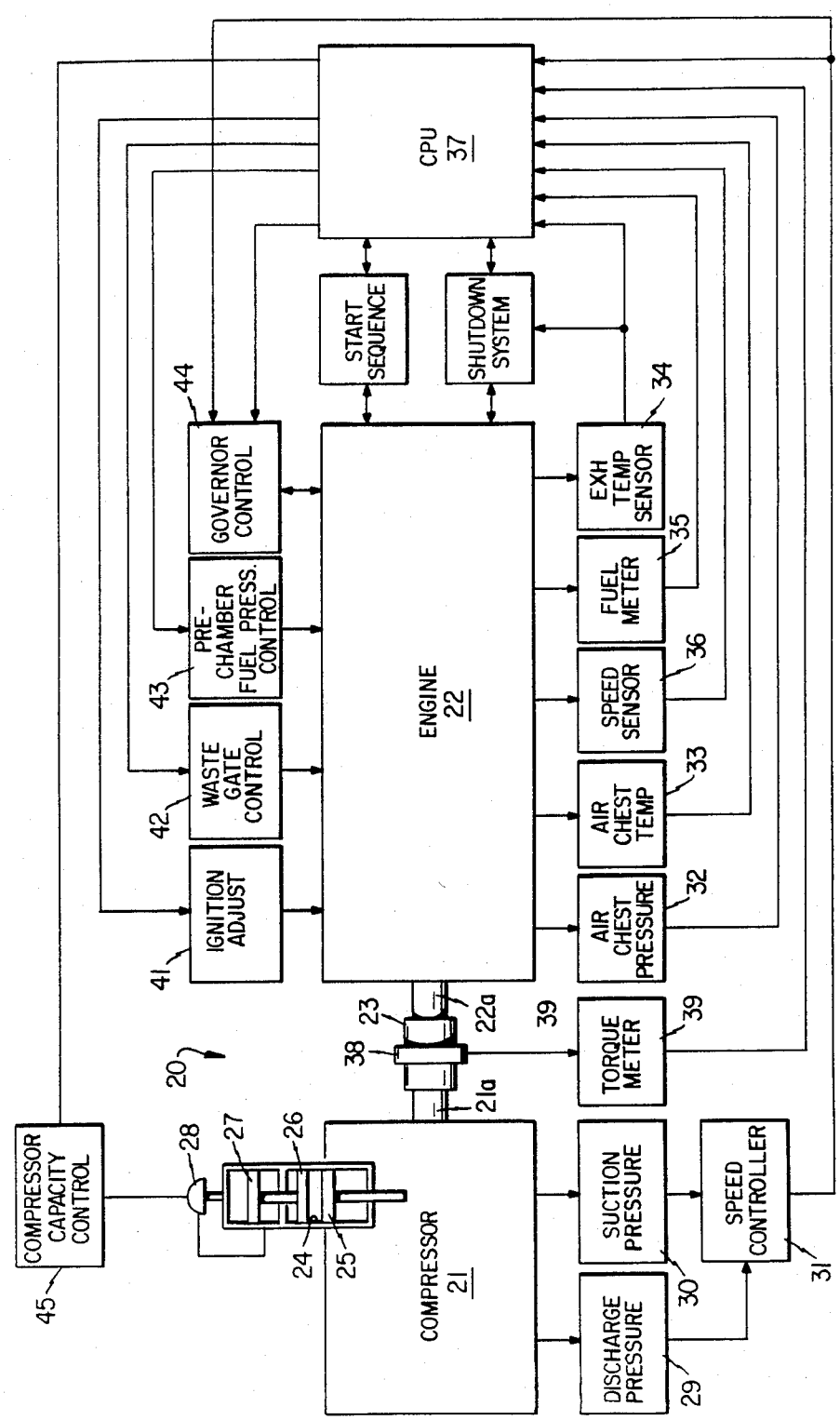
FIG. 1 is a block diagram of the control system of the present invention as applied to an engine-driven compressor unit.

Referring more particularly to the drawings, FIG. 1 is a schematical representation of the control system of the present invention as used with engine-driven, compressor unit 20. As will be understood by one skilled in the art, unit 20 may be a skid-mounted unit or may be assembled onto a permanent base and is comprised of a compressor 21 and a dedicated engine 22. Compressor may be any of several well know, commercially-available positive-displacement compressors having one or more cylinders and having one or more stages of compression. A typical example of compressor 21 is a 6-cylinder, Model OFGxHG, distributed by Worthington Group, McGraw-Edison Co., Buffalo, N.Y. Engine 22 is a multi-cylinder, cleanburn, turbo-charged, natural gas fueled engine, a typical example of which is Model 12G-270, distributed by Alco Power, Inc., Auburn, N.Y. Engine drive shaft 22a is connected to compressor driven shaft 21a by means of flexible coupling 23 which will be described in detail below.

Each compression cylinder 24 (only one shown) of compressor 21 has a head 26 which can be moved into or out of cylinder 24 to thereby decrease or increase the effective capacity volume of the cylinder. As shown, head 26 is moved by hydraulic piston 27 which, in turn, is actuated by operator means 28, e.g. hydraulic pump, but it should be understood that head 26 could be moved by other means, e.g. a screw shaft actuated by a motor, (not shown) without departing from the present invention. Sensors 29, 30 continuously monitor the compressor discharge and suction pressures, respectfully, and supply signals representative of said respective pressures to speed controller 31 for a purpose to be explained later.

Air chest pressure sensor 32, air chest temperature sensor 33, exhaust temperature sensor 34, fuel meter 35, speed sensor 36 and torque sensor 38 all continuously monitor their respective functions and supply signals representative thereof to central processing unit (CPU) 37 where the signals are processed for use in controlling engine 22, as will be later explained in detail.

Ignition adjust means 41, waste gate trim means 42, pre-chamber fuel pressure regulator means 43, and governor control means 44 (all explained in detail below) each receive an appropriate processed control signal from CPU 37 to adjust their respective engine parameters in response to certain sensed conditions from engine 22 as will be explained below. Governor control means 44 also receives a control signal from speed controller 31 under certain conditions as explained below. Compressor capacity control means 45 controls operator means 28 on compressor cylinder 24 in response to a signal from CPU 37 as will be explained below.

Start sequence means 45 is provided to insure proper and safe start-up of engine 22 and shut-down system 46 continuously monitors critical functions of both compressor 21 and engine 22 and shuts down unit 20 when safety conditions are exceeded. Both start sequence means 45 and shut-down system 46 will be better understood when further explained below. With the general arrangement and basic interrelationship of unit 20 and the associated control system having now been set forth, the various individual components and their operation will be explained below under the following appropriate headings which are used only for the sake of clarity.

FUEL SUPPLY SYSTEM

Referring now to FIG. 2, fuel (e.g. natural gas) for engine 22 is fed into main fuel line 50 at a regulated pressure where it is measured by flow meter. Meter 35 may be of any type that can measure the fuel flow and generate a signal representative thereof, e.g. turbine flowmeter Model FT 12, distributed by Flow Technology, Inc., Phoenix, Ariz. The signal from meter 35 is supplied to CPU 37 via line 35a for a purpose described later. Fuel passes through meter 35 and into volume tank 51 where it separates thereby reducing its tendency to contain free liquids. The fuel then flows through check valve 52 and through 3-way safety valve 52 which can be opened by a signal from CPU 37 to vent the fuel from main fuel line 50 in an emergency shutdown situation. Fuel in main fuel line 50 flows through one or more rotary valves 53 which actually regulate the amount of fuel to the combustion cylinders of engine 22. As understood in the art, valves 53 (one for each bank of cylinders) are rotated to open or close an opening therethrough in response to governor 44 via mechanical linkage 44a to thereby increase or decrease the amount of fuel to engine 22 as required by the engine conditions.

Governor 44 has a fuel limiter section 44c which is responsive to a signal from CPU 37 during the start sequence (explained later) to move governor 44 and, hence, valves 53 to a substantially closed position to guard against flooding engine 22 during the initial phases of start. Also governor 44 includes a speed control section 44b which is responsive to manual control and/or to a signal from speed controller 31, the later occurring when engine 22 is to be slowed down in response to an undesirable condition in compressor 21, as will be explained later.

A secondary fuel line 50a takes fuel from main fuel line 50 and supplies it to prechambers 55 (only two shown) of engine 22. As understood in the art, each combustion cylinder of a clean-burn engine has a prechamber or precombustion chamber (as it is sometimes called) as a part thereof, in which the initial ignition takes place. The spark plug is located in the prechamber and ignites a small volume (approximately 2% of total) of the fuel-air mixture. This rich burned fuel-air mixture is then expelled into the main combustion chamber to create multiple points of ignition in the lean main cylinder and ignite this fuel and air to complete a lean-burn combustion process. This allows the engine to be run with a leaner mixture than could be otherwise used. Fuel in line 50a is controlled by prechamber fuel pressure control means 43, e.g. Mark 70 Jordan Pilot Fuel Regulator, distributed by Hatfield Co., Houston, Tex., which, in turn, is responsive to a signal from CPU 37 to control the pressure of the fuel therthrough, as will be explained later.

WASTE GATE CONTROL AND IGNITION ADJUST

As understood in the art, the compressor blower of a turbo-charged engine is driven by a power turbine which, in turn, is powered by the exhaust gases from the engine. The compressed air generated by the compressor blower is supplied to an air chest for engine 22 where it builds up a storage of air under a desired pressure. Air from the air chest flows to the intake valves of the engine from which it is supplied to the engine cylinders in a proper ratio with the fuel to provide good combustion in the conbustion cylinders of the engine. The pressure in the air chest is controlled by the speed of the blower which, in turn, is directly controlled by the flow of exhaust through the turbine which drives the blower.

Further as understood in the art, a valve, commonly called a "waste gate", is used to regulate the amount of the exhaust that flows through the power turbine. Referring now to FIG. 3, waste gate 57, e.g. butterfly valve 58, is positioned between exhaust manifold 59 and turbo outlet 60 and, as shown, directs all of the exhaust to the atmosphere. Valve positioning means 61 (e.g. pneumatically-operated, Moore Positioner Model No. 74, distributed by Moore Products Co., Springhouse, Pa.) is coupled to valve 58 to rotate same in response to a signal from CPU 37 to direct a desired amount of exhaust away from or into turbo inlet 60 for a purpose described below.

It is well known that the ignition timing of an engine can be retarded or advanced by rotating the ignition alternator on the engine to different known positions. Referring now to FIG. 4, one means for adjusting the ignition timing is shown in simplified form. Pneumatic pressure is applied or released by a signal from CPU 37 to move ignition alternator 62 against the bias of spring 63 to advance the ignition timing or to allow the bias of spring 63 to move alternator 62 in the opposite direction to retard the timing.

TORQUE MEASUREMENT MEANS

Figure 5:
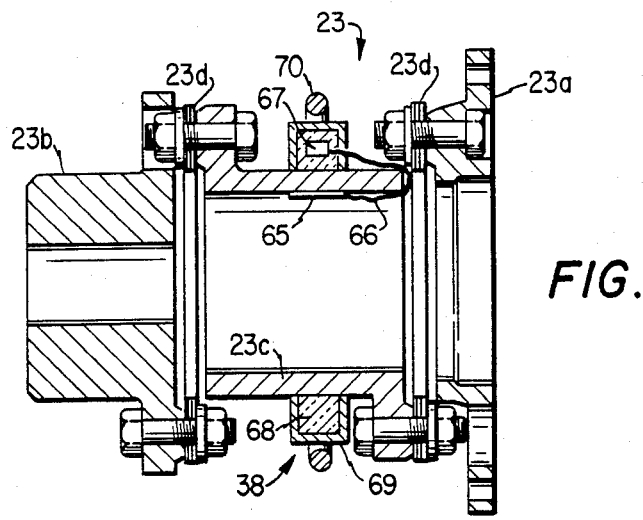
FIG. 5 is a cross-sectional view of the flexible coupling which connects the engine and compressor of FIG. 1 and of the torque-sensing means.

Drive shaft 22a of engine 21 is connected to the driven shaft 21a of compressor 21 by means of flexible coupling 23. Such couplings are routinely used for this purpose in the art and can be any of several commercially-available couplings (e.g. Double Flexing Coupling, Type FSH-75, distributed by Formsprag Div., Dana Corp., Houston, Tex.), commonly used to compensate for nominal misalignment of shafts 21a, 22a. As understood in the art, coupling 23 (FIG. 5) is comprised of hubs 23a, 23b that connect to shafts 22a, 21a, respectively. A center member 23c connects hubs 23a, 23b together by means of a plurality of high strength steel discs 23d which, in turn, are alternately bolted to the respective hubs and member 23c, as shown in FIG. 5, to thereby allow limited rotation between hubs 23a, 23b, and hence, shafts 21a, 22a.

Figure 6:
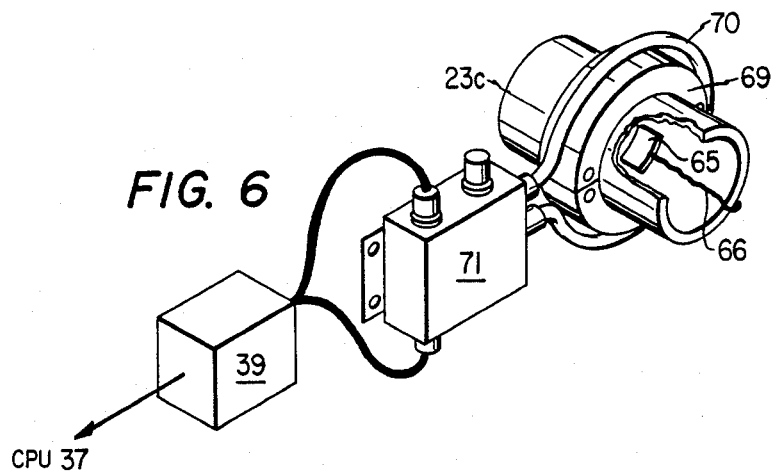
FIG. 6 is a perspective view, partially in section, of the torque sensing means of FIG. 5.

Torque sensor means 38 is positioned to continuously sense the torque being developed in flexible coupling 23 and to transmit a signal representative thereof to torque meter 39. Torque sensor means 38 may be any means capable of performing this function but is preferred to be a torque sensing unit of the type illustrated in FIGS. 5 and 6, and is one which is commonly used to sense torque in large steam turbine shafts, large ship propeller shafts, and the like. As illustrated, strain gauge 65, e.g. General Electric Strain Gauge Transducer Type 4, is affixed to the interior of section 23c of flexible coupling 23 and is connected by lead 66 to an amplifier unit 67 which is embedded in phenolic resin ring 68, which, in turn, is encased in hinged collar 69. Collar 69 bolts onto section 23c as shown in FIG. 6 and is fixed thereto and rotated therewith. Amplifier 67, ring 68, and collar 69 are known and are commercially available, e.g. Autodata No. 1226A High Speed Collar w/No. 1216 Rotary Module, distributed by Acurex Corp., Mt. View, CA.

Power unit 71 has a ring-shaped antenna 70 which, in turn, is positioned around and spaced from collar 69. Power unit 71 is also known and commercially available, e.g. Autodata No. 1211A Power Separation Unit, distributed by Acurex Corp., Mt. View, CA. Unit 71 is connected to torque meter 39, e.g. Autodata No. 12060 Torque Readout Unit, distributed by Acurex, which (a) furnishes power to element 69 at one radio frequency (RF) through antenna 70 and receives data from element 69 through antenna 70 at a second RF. This allows strain gauge 65 to transmit the measured torque during rotation of coupling 23.

CONTROL MAPS

In the control system of the present invention, a plurality of "maps" for controlling engine 22 and/or compressor 21 are stored in CPU 37. As used herein, the term "map" includes data which is stored in read-only memories (ROMs) or equivalent memory units and the input and output circuitry therefor. The various maps described below each constitute a control signal means for (1) storing a plurality of control signals each having a predetermined value corresponding to a desired setting of one of the control means for unit 20; and (2) generating said control signal in response to an input signal or signals.

As is known in the art, it is now routine for an engine manufacturer to test each engine model "on brake" at the factory to establish actual operating data for the engine. For example, the specific fuel consumption (BTU/horsepower/hour) is determined for differing speed and load conditions over the expected operating range of the engine and the exhaust is analyzed at these varying conditions to establish the differing amounts (BHP/HR) of nitrogen oxide (NOX) that will be emitted. From this test data, the maps for the present control system are derived.

Four sets of maps are used to carry out the necessary control for unit 20. These are: (1) Speed vs. Load maps which respond to the sensed speed and load of engine 22 to select the proper map for the ignition and waste gate settings; (2) Ignition-Air Chest Pressure maps which respond to a signal from the Speed-Load map to output signals to adjust the ignition and the waste gate; (3) Prechamber Fuel Pressure-Air Chest Pressure map which responds to an air chest pressure signal to adjust the prechamber fuel pressure; and (4) Compressor Suction Pressure-Compressor Capacity map which responds to the suction pressure to change the capacity (throughput) of the compressor. As mentioned above, all of these maps are actually in the form of stored data and instructions in CPU 37, but to better understand the derivation of this data and the relationship therebetween, it will be discussed in relation to the representative graphs shown in the figures.

Figure 7A:
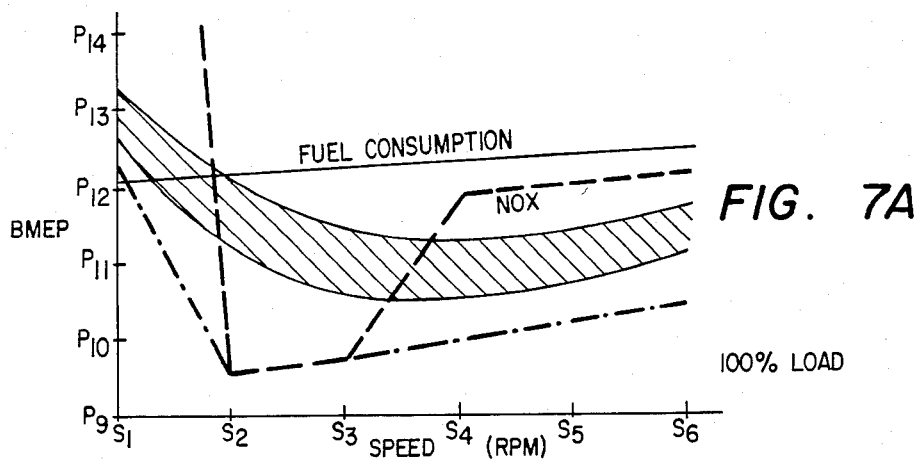
FIGS. 7A, 7B, 7C are graphical representations of the speed-load maps of the present control system.
Figure 7B:
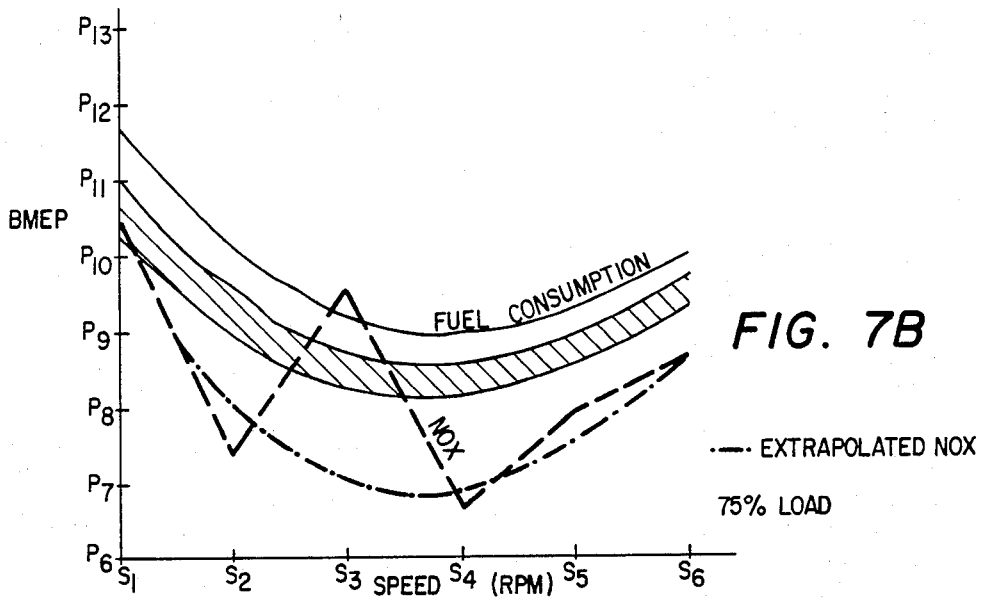
Figure 7C:
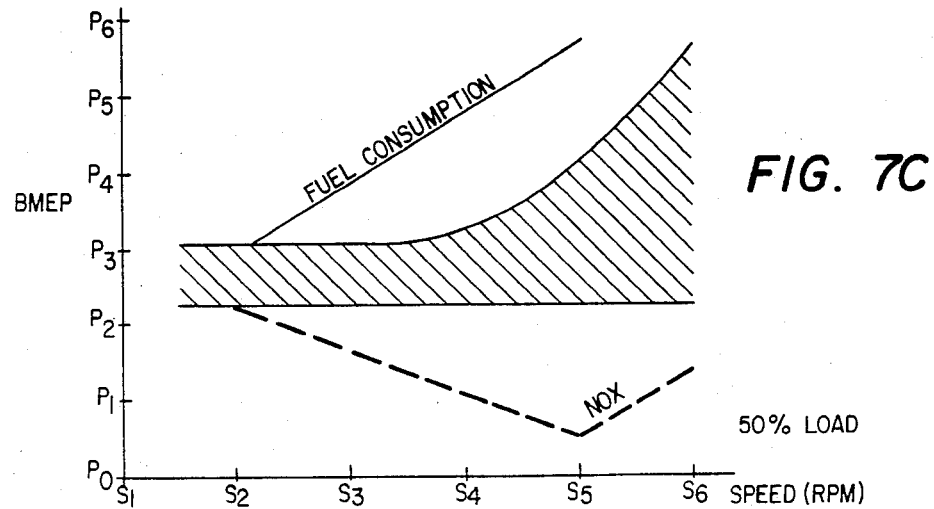

Referring to FIGS. 7A, 7B, 7C are representative of plots for a particular engine 22 wherein the engine's specific fuel consumption and NOX emissions are plotted at the differing speeds (rpms) and load (brake mean effective pressure or BMEP) conditions throughout the operating range of engine 22. It should be understood that these plots are illustrative only and that the plots for different engines may have other configurations. However, the basic principles involved will remain the same.

The load or BMEP of an engine is directly related to the torque and cylinder displacement of the engine in the following relationship:

$$BMEP = 150.8 T/D$$

where:
150.8 = Units Conversion constant
T = Torque in pound-feet
D = Total displacement of engine cylinders in cubic inches.

Since D is known and remains constant for a particular engine, the measurement of torque can easily be shaped to provide a direct measurement of BMEP or load.

In the figures, FIG. 7A represents the conditions of engine 22 when it is operating at its rated 100% load at differing speeds over its operating range (e.g. 500 to 1000 rpms); FIG. 7B is at 75% load at the same speeds; and FIG. 7C is at 50% load at the same conditions. From these plots, an operating zone (cross-hatched in figures) is established for each of the plots which provides the best fuel consumption for engine 22 at a respective speed and load which will keep the NOX emissions in the exhaust at a level within the limits set by the EPA for exhaust emissions. It is within this crossed-hatch zone that the present control system is designed to operate.

Figure 8:
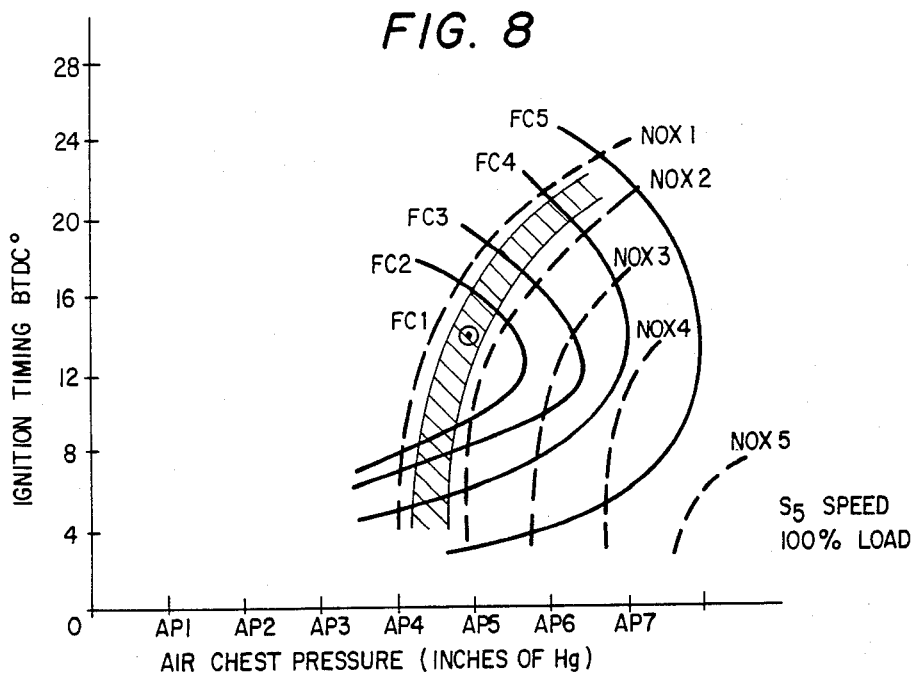
FIG. 8 is a graphical representation of a typical map of the present control system at a particular speed and load having predetermined ignition and waste gate control settings thereon.

The data from the maps of FIGS. 7A, 7B, 7C can be replotted as a series of control maps (only one shown in FIG. 8) which define a plurality of control signals, each having a predetermined value which, when outputted, will (1) adjust the ignition of engine 22 to a desired setting; and (2) will trim the waste gate to thereby control the turbocharger so that a desired pressure will be maintained in the air chest of engine 22. FIG. 8 represents the settings for only one particular speed (e.g. 900 rpms) and one particular load (100%) at said speed but other similar maps for a wide range of other specific operating conditions are stored in CPU 37. For example, a typical control system of the present invention will have maps for 50%, 75%, and 100% loads at each speed interval (e.g. 50 rpm increments) throughout the operating range (500–1000 rmp) of engine 22, or a total of 15 maps of the type in FIG. 8. Of course, more or fewer maps can be plotted and used depending on the fineness of control desired.

On FIG. 8, it is desirable to operate within the lowest band of NOX (e.g. NOX 1 on plot) for the specific fuel consumption (e.g. FC 1) to provide the best trade off between the two and remain within EPA standards. The fuel consumption values (FC) are affected by the BTU rating of the fuel actually being used and this data will be manually encoded to CPU 37 for the known fuel being used and will be changed only if the fuel is changed.

Figure 9:
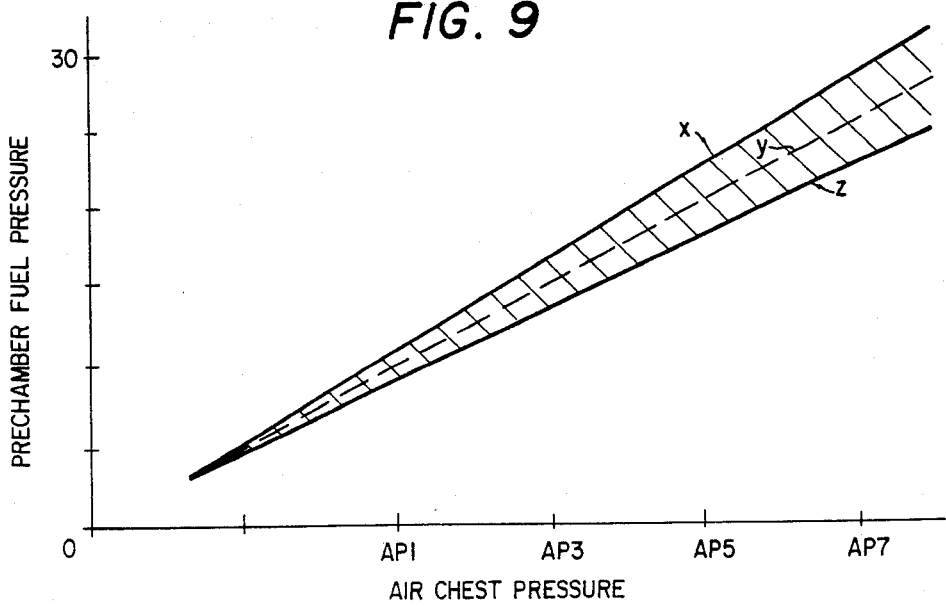
FIG. 9 is a graphical representation of a map of the present control system containing predetermined control settings for the prechamber fuel pressure.

FIG. 9 represents the map which is used to adjust fuel pressure regulator 43 (FIG. 2) to thereby supply the proper amount of fuel to the prechambers of engine 22 to maintain a proper air-fuel ratio which will insure proper ignition at the then present operating conditions of engine 22. Line x on FIG. 9 represents the optimized relationship between the air chest pressure and the prechamber fuel pressure for a fuel which has the lowest BTU value likely to be used in the operation of engine 22. Since the use of low BTU fuel will produce a higher fuel/air ratio, line x also represents operating conditions where the air chest temperature is relatively high. The significance of this will become apparent below.

Line z represents the optimized relationship between the air chest pressure and the prechamber fuel pressure for a fuel having the highest BTU value likely to be used. Likwise, this line represents low air chest temperature. Dotted line y represents the theoretical bias (e.g. 120° air chest temperature and 14.7 psia) of the plot. As with FIG. 8, the BTU value of the fuel actually being used will be known and encoded to CPU 37 for use with the plot of FIG. 9, as will be explained later.

Figure 10:
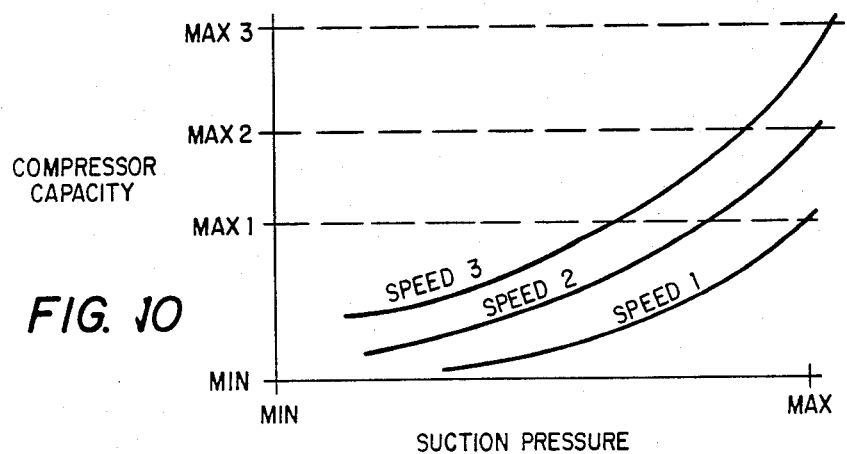
FIG. 10 is a graphical representation of a map of the present control system for controlling the capacity of the compressor in response to the suction pressure of the compressor and the speed of the enigne.

FIG. 10 represents the map used for supplying the necessary signals to compressor capacity control 45 (FIG. 1). The suction pressure of compressor 21, as measured by sensor 30, is supplied to the plot of FIG. 10 and when it exceeds the predetermined maximum value for the particular speed (speed 1, 2 or 3) at which engine 22 is operating, an output signal will cause operator 28 to move heat 26 to adjust the capacity (throughput) of compressor 21 to bring the capacity into desired limits. Now that all of the present control maps have been described, the operation of the entire system will now be set forth.

LOGIC CONTROL DIAGRAM FOR CONTROL SYSTEM

Figure 11:
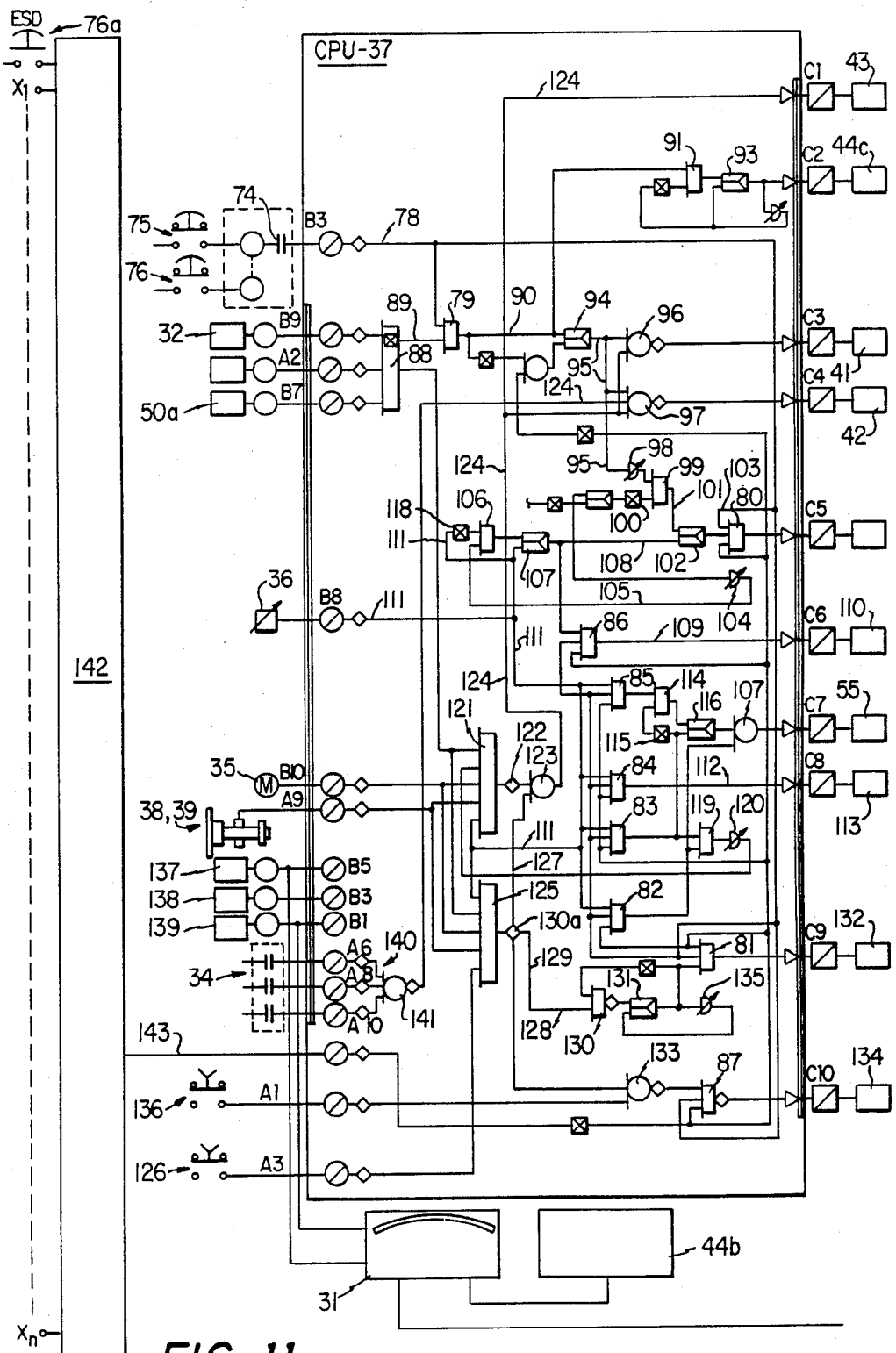
FIG. 11 is a schematical logic flow diagram for the present control system.

Logic flow diagram for the present control system is shown in FIG. 11. It should be recognized that the control functions and handling of data as represented in FIG. 11 can be "hard-wired" or can be programmed to be processed by any of several commercially available general purpose computers, (CPU 37), e.g. Acurex Ten/50 Computer, distributed by Acudata.

As illustrated, CPU 37 has two input cards A, and B (not shown) which are capable of handling 10 input channels each. Card A will handle thermocouple inputs, voltage inputs, and contact closure inputs. Each channel of cards A and B, respectively, is number 1 through 10, so a designation A3 on FIG. 11 designates channel 3 of card A and so on. Card B will handle only low current (4–20 mA) analog inputs. Each input channel has its own multiplexer (e.g. A2a, only one numbered in FIG. 11) which converts all analog or level inputs to a common digital base. CPU 37 has one output card C with 10 channels thereon. Each channel is a low amperage (e.g. 4–20 mA) analog output and are numbered C1 through C10 above their respective output amplifiers in FIG. 11. Also, in FIG. 11, particular sensed conditions are converted into appropriate analog and/or digital signals by an appropriate transducer, i.e. pressure to current (P/I) or temperature to current (T/I) while the particular outputs from CPU 37 are converted into usable signals by an appropriate transducer, i.e. current to pressure (I/P). Further, the present system is intrinsically safe in that the electrical signals in the system are of such low amperage (e.g. 4 to 20 milliamp (MA)) that even an open contact will not ignite a hydrogen-hydrocarbon mixture of the type that may be present around units such as engine compressor unit 20.

To start engine-compressor unit 20, start button 75 is pressed. If it becomes necessary to stop operation of unit 20 under normal conditions, stop button 76 is depressed which will deactivate all output signals. Unit 20 can be shut in under emergency conditions by pressing emergency stop button 76A which immediately deactivates the AC power to the unit and will ground the engine ignition alternator thereby stopping engine 22. Power to compressor valve sequencing means 134 will also be deactivated.

Upon activating start button 75, latching relay 74 is energized thereby putting a maintained level input signal on line 78 which, in turn, provides a signal to each of the following AND gates: 79 through 87. There will be no air chest pressure signal from sensor 32 so there will be a level output from AND 88 on line 89. The signals to AND 79 will output a level signal on line 90 to AND 91 to provide an output signal to AND 92 which, in turn, outputs a signal to turn on MEMORY 93. This provides a signal through output amplifier C2 to the fuel limiter section 44c of governor 44 to back off the governor to insure that engine 22 will not be flooded during initial start conditions. Memory 94 is also turned on and outputs a signal on line 95 to OR 96 which, in turn, provides a level signal through output amplifier C3 to ignition adjust means 41 to adjust (retard) the ignition for start conditions. OR 96 provides a programmed function in that when a level signal from MEMORY 94 is present, the output signal has one specific value (e.g. 7mA) and when no such signal is present at OR 96, the output signal will be at a second specific value (e.g. 4mA) and no adjustment to the ignition will be effected.

OR 97 is present in line 95 which provides a level output on line 95a to give a pre-programmed output signal through amplifier C4 to waste gate adjustment means 42 to close the waste gate 58 (FIG. 3) for engine start.

The signal in line 95 also turns on timer 98 and after a delay (e.g. 10 seconds), a level signal exists at AND 99. A level signal from NOT 100 provides the other signal to AND 99 which, in turn, outputs a signal on line 101 to turn on MEMORY 102 thereby producing an output signal on line 103. All signals are now present at AND 80 which outputs a signal through amplifier C5 to initiate routine prelube operations for unit 20. The signal on line 103 also provides an input to NOT 100 causing the output signal from AND 99 to be removed which allows MEMORY 102 the capability of being turned off later.

The signal on line 103 still further turns on timer 104 and after a delay for prelube (e.g. 60 seconds), an output signal is applied on line 105 to AND 106. The other signal to AND 106 is already present since it is preprogrammed to exist until the speed of engine 22 has reached a predetermined value (e.g. 150 rpm). AND 106 outputs a signal to turn on MEMORY 107 to output a signal on line 108 which turns off MEMORY 102 causing the signal to amplifier C5 to revert to its original value (e.g. 4 mA) thereby shutting off the prelube operations. The signal on line 108 provides the last required signal to AND 86 which now outputs a signal on line 109, through amplifier C6 to engine starter 110.

A key function in the present system from this point on is the speed signal generated by the engine tachometer 36 and which is carried on line 111. When engine speed reaches a first predetermined value (e.g. 80 rpm), an analog signal exists at AND 84 which now outputs a signal on line 112 and through amplifier C8 to turn on engine ignition 113. When the speed of engine 22 reaches a second and higher predetermined value (e.g. 90 rpm), an analog signal exists at AND 85 which now outputs a signal to AND 114. The other required level signal to AND 114 is being supplied by NOT 115 so that AND 114 now outputs a signal to turn on MEMORY 116 which, in turn, outputs a signal to OR 117 which, in turn, outputs a preprogrammed signal through amplifier C7 to open fuel valve 55 to a start position.

When engine speed reaches a third and still higher predetermined value (e.g. 150 rpms), NOT 118 loses its signal thereby causing a loss of signal from AND 106 and turning off MEMORY 107. An analog signal is now present at AND 83 which outputs a signal to turn off MEMORY 116 and to provide an input signal to AND 119 which is also receiving a signal now being outputted from AND 82. AND 119 outputs a start signal for timer 120 which allows fuel value 55 to remain full open for a predetermined time interval (e.g. 30 seconds); value 55 having been moved to an open position by the output signal from of AND 82.

AND 121 is now getting an output signal from AND 88 since air chest pressure 32, air chest temperature 33, and fuel pressure 50a (FIG. 2) are all now at a value capable of being measured. The output from NOT output section 88a of AND 88 on line 89 is now lost allowing MEMORY 94 to be turned off thereby causing the last of the signals to OR 96. This is necessary so ignition 41 can be adjusted during the operation of unit 20. AND 121 is also now receiving analog signals from fuel meter 35, AND 119, torque means 38, 39, and tachometer 36 so AND 121 now outputs multiplexed signals through multiplexer 122 to OR 123 which outputs signals on line 124. Certain of these multiplexed signals adjusts waste gate 42, ignition timing 41; and the prechamber fuel regulator 43.

All but one input signal is now present at AND 125 (these being the same signals as those at AND 121). When compressor load selector switch 126 is activated, the last input signal is supplied to AND 125 which then outputs multiplexed signals onto lines 127, 128, 129 through multiplexer 130. The signal on line 127 provides an analog signal to OR 123 to, in turn, provide an analog signal to adjust waste gate 42, ignition means 41, and prechamber fuel regulator 43. The signal on line 128 provides a signal to AND 130 whose output signal turns on MEMORY 131 which, in turn, provides an input signal to AND 81 which, in turn, provides a signal through amplifier C9 to operate, if needed, the jet assist means 132 for engine 22, as will be understood by those skilled in the art. If jet assist 132 is not required or after jet assist is turned on, a signal is put on line 129 and applied to OR 133 to thereby provide an input signal to AND 87 which, in turn, provides an output signal through amplifier C10 to begin compressor valve sequencing 134 thereby bringing compressor 21 on line; this sequencing being routine and well understood in the compression art. The signal from MEMORY 131 goes to NOT 134 which removes the signal from MEMORY 131 allowing MEMORY 131 to be turned off after a delay (e.g. 60 seconds) by timer 135. This stops jet assist 132 by removing an input to AND 81.

Compressor manual-automatic selector switch 136 is normally in the automatic positon. By switching the switch 136 to the manual position, a level signal is put on input A1. This brings on compressive valve sequence 134 at any time swtich 136 is activated by providing a level signal to amplifier C10. Sensors 137, 138, 139 measure compressor suction pressure, interstage compression pressure, and discharge pressure, respectively, and the signals representative thereof are fed through inputs B5, B3, B1, respectively, to a visual display or the like for scan and/or printout purposes only. Also, the suction pressure signal from 137 and discharge pressure signal from 139 are fed to speed controller 31 outside of CPU 37 which, in turn, provides control signals to governor speed control section 44b, as will be explained below.

Temperature scanner 34 puts out three contact signals which are the average value of the temperature in all of combustion cylinders of engine 22. Input A6 receives a signal representative of highest permissible temperature (e.g. 1150° F.); input A8 receives a medium temperature signal (e.g. 975° F.) and input A10 receiver the lower limit temperature signal (e.g. 750° F.). These signals are multiplexed at 140 and the multiplexed signal present at OR 141 is applied to OR 97 which, in turn, supplies a signal to amplifier C3 to adjust waste gate 41 to lower the temperature on the cylinders when necessary. If the temperature of the cylinders continues to rise and exceed the high value, a fourth contact (not shown) on scanner 34 will cause a normal shut-down of unit 20 through the annunciator shutdown device 142.

Annunciator 142 is comprised of a plurality of means each of which receives a signal from respective a sensor on engine 22 or compressor 21 and compares said signal to a reference signal which, in turn, is representative of a maximum or minimum value (as the case may be for a particular measured parameter) to generate an error signal when said reference value is exceeded to sound an alarm or shut down unit 20 through the shut down line 143 to CPU 37. Numerals $X_1-X_n$ on annunciator 142 represent inputs for the various sensors on engine 22 or compressor 21 and which include such sensors for such parameters as the engine oil and water temperatures at various locations within the engine; exhaust temperature; engine and compressor oil levels and pressures; turbo exhaust temperature; compressor suction and discharge pressures; engine prechamber temperature; etc.

Speed controller 31 receives signals from compressor discharge pressure sensor 29 and compressor suction pressure sensor 30. If suction pressure drops, a signal goes to governor speed control section 44b to slow down engine 22. If the suction pressure rises, a signal from controller 31 will speed up engine 22. However, when discharge pressure exceeds a safe or desired value, the signal from discharge sensor 29 will override the suction pressure signal and will maintain the engine speed at a safe predetermined level.

OPERATION OF CONTROL SYSTEM

Figure 12:
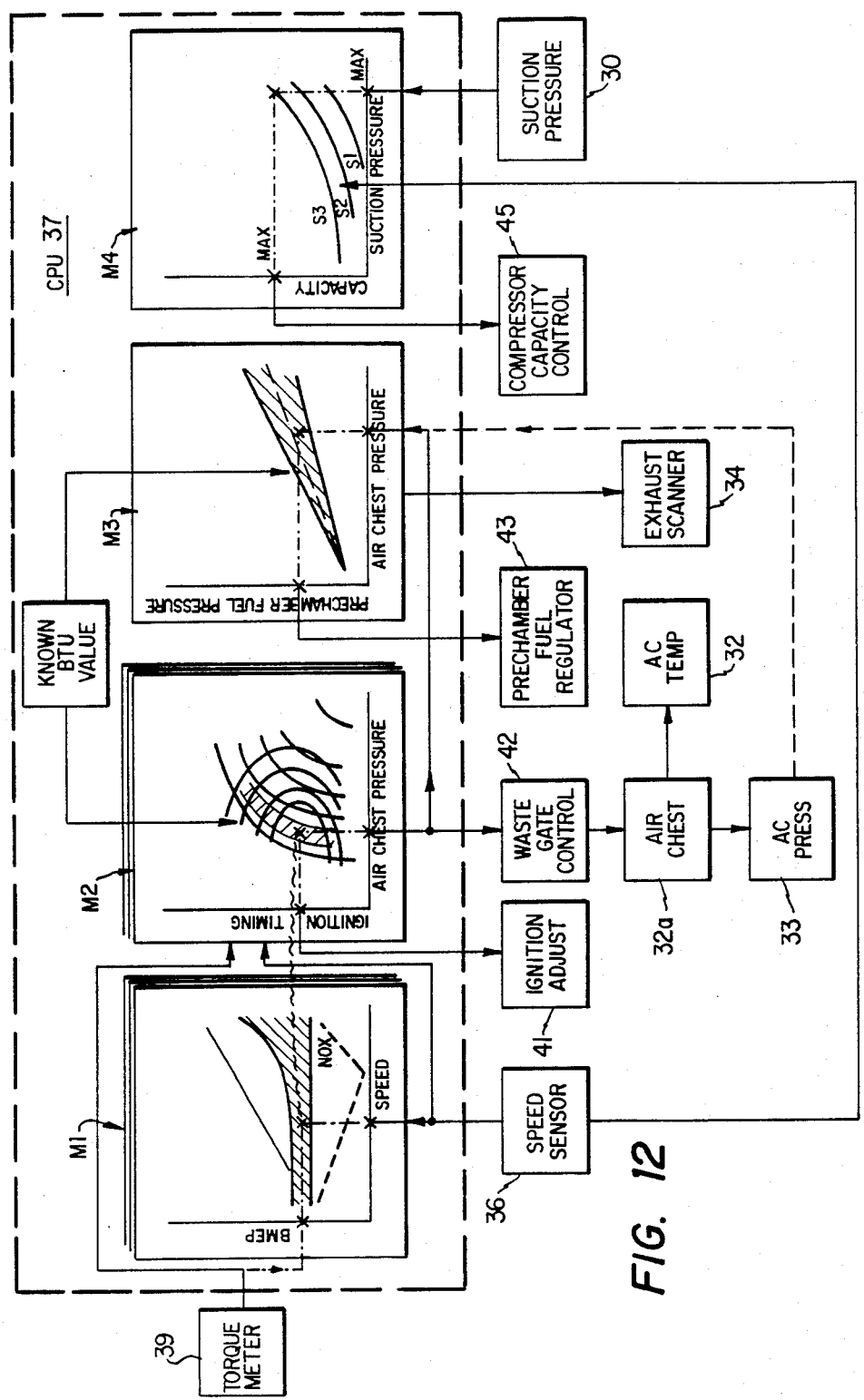
FIG. 12 is a further block diagram of the present control system.

Referring now to FIG. 12, speed sensor or tachometer 36 continuously measures the speed (rpms) of engine 22 and torque meter 39 continuously measures the torque in coupling 23. As explained above, torque is directly related to load of engine 22 so the signal from meter 39 can be scaled to be representative of the actual load on engine 22 at any particular time. The speed and load signals are inputted to the Load-Speed Map M1 in CPU 37 and a point X is established within the desired operating zone or band on M1. This point or value of X is then applied to the particular Ignition Timing-Air Chest Pressure Map M2 which corresponds to the speed (e.g. 900 rpm) and the load (e.g. 100%) signals being received by CPU 37. The known value (BTU/HP/Hr) is manually encoded into Map M2. Again, it is emphasized that the stored data (maps), processing of signals, and the outputting of signals will be carried out from programmed instructions and data stored within CPU 37 and that the graphs and description here are for illustrative purposes only.

Upon point X being inputted to map M2, a control signal representative of a particular predetermined ignition setting is outputted from M2 and is applied to ignition adjust means 41 to thereby adjust the ignition timing setting for engine 22 to a value required to allow engine 22 to operate at conditions (i.e. desired fuel consuption and low NOX emissions) corresponding to the speed and load of engine 22 and the BTU value of the fuel. At the same time, M2 outputs a control signal representative of a particular predetermined waste gate setting to waste gate control 42 to adjust waste gate 58 (FIG. 3) to said setting to thereby allow engine 22 to operate at the desired conditions. As explained above, the waste gate setting controls the speed of the turbocharger which, in turn, supplies air (air pressure) to air chest 32A.

The signal from M2 to waste gate control 42 is also applied to Prechamber Fuel Pressure-Air Chest Pressure Map M3 which also has the known BTU value of the fuel encoded thereto. Map M3 then outputs a signal representative of a particular predetermined setting of prechamber fuel measure regulator 43 which corresponds to the known fuel value and air chest pressure to thereby supply the proper amount of fuel to the prechambers of engine 22.

It is noted that the actual pressure in air chart 32A is also being continuously measured and a signal representative thereof is applied to M3 to further "fine-tune" the waste gate setting in response to minor changes in air chest 32A. This actual measurement allows the actual settings to compensate for ambient conditions such as atmospheric pressure, temperature, and humidity, all of which may change from time to time and all of which effect the volume of the air, and hence, the pressure in air chest 32A. Also, signals from exhaust scanner 34 are inputted into map M3 to further "trim" waste gate 58 in response to changes in exhaust temperature. Map M4 reserves signals from speed sensor 36 and from suction pressure sensor 30. When the suction pressure exceeds a predetermined maximum value for the particular speed being sensed, a predetermined control signal is outputted from M4 to compressor capacity control means 45 to adjust the effective capacity of the compression cylinders of compressor 21 so safe and efficient operation can continue and the unit 20 will not have to be shut in until extreme conditions are reached. To better understand the present invention, some specific examples will now be set forth illustrating what takes place when a change in operating conditions occur.

EXAMPLE I (Engine Load Increase due to Speed Increase)

The load on the engine 22 may increase through a speed increase due to a higher demand rate or throughput required of compressor 21. However, the Brake Mean Effective Pressure (BMEP) or load may not have to increase due solely to the new demand. In this event, the engine speed controller 31 would sense this new demand and allow the governor 44 to increase the fuel rate to sustain the new demand throughput. This change in speed is sensed by speed sensor 36 which signals the CPU 37 to read a new map of new conditions (e.g. full load at higher speed). The CPU 37 recalls this new map and sends output signals to "modify" the engine's "regulatory members" such as ignition timing, waste gate control and prechamber fuel pressure as described above.

However, the control system is also designed to identify within a certain zone width on this desirable map region and react to other daily changes such as ambient temperature, relative humidity and quality of the fuel, so on a theoretical basis, one can expect reasonable control within the zone width through modifications of trimming due to other engine limiting parameters such as BMEP, engine exhaust temperature and air manifold pressure and temperature.

EXAMPLE II (Engine Load Increase due to BMEP Increase)

Compressor 21 may sense an increase of suction pressure which will tend to increase the load or BMEP on engine 22. However, since another controlling factor, i.e. the compressor discharge pressure, overrides the suction pressure, the output signal from speed controller 31 to the engine governor 44 will not change. The torque will increase due to the increased suction pressure and subsequent increased volumetric efficiency of compressor 21 thereby increasing BMEP of engine 22. In this case, a change signal will be sent from the torque sensor 39 to CPU 37 to obtain maximum BMEP within the parameter set by a particular map, based on the new torque and speed of engine 22. Once engine 22 reaches its maximum BMEP, the CPU 37 sends a signal to compressor capacity control means 45 to unload until a safe operating range is attained. In such a case, an increase in fuel would be a demand and depending on the efficiency envelope of the engine's turbocharger, the waste gate may be opened or closed. This is a reactive and trim function of various controlling parameters such as those previously mentioned, i.e., ambient air temperature, relative humidity, fuel heat value and to some extent the mechanical readiness of the engine and its preparedness to accept change. Obviously, if engine 22 is at maximum BMEP and an increase signal will not allow engine changes since the maximum had been reached, CPU 37 will opt to change efficiency of the compressor cylinders to reduce load, otherwise, the inherent safety shutdown system would shut in the engine due to high exhaust temperature.

This system is complex due to the continual changing environment and demands placed on it, hence there is the need for real time changes within the mapping zone width.

EXAMPLE III (Load Decrease Through Speed Reduction but BMEP Remains the Same)

This situation is controlled primarily by the engine's speed control system which adjusts the fuel supply through governor 44 and places demands on the trimming functions, e.g. waste gate, ignition timing, and prechamber fuel pressure by means of the processed signals from the torque sensor 39, speed sensor 36, and the zone selected within CPU 37.

EXAMPLE IV (Load Decrease Through BMEP Reduction but Speed is Held Constant)

This is another real demand placed on engine 22 by controlling compressor 21. In this case, the suction pressure on compressor 21 will fall off reducing the torque required to maintain a certain BMEP level, however, the total plant throughput demand is met and no change is required in speed of engine 22 by CPU 37.

Governor 44 will react to the lighter load and reduce the fuel rate, which in turn, will lower air manifold pressure thereby changing the prechamber fuel pressure. The waste gate will probably open, however, it could close depending upon (1) elevation, (2) the matching envelope of the turbocharger, and (3) other controlling parameters such as fuel heat value, ambient air temperature and relative humidity as well as the mechanical condition of the engine.

Again, optimizing within a zone or band through a "real feel" for operating parameters and not just a theoretical curve as most engine manufactures with lean burn engines have done in this regard.

From the above description, it can be seen that the present invention provides a control system which is primarily responsive to any changes in the torque (load)

and/or speed of engine 22 to control the ignition timing, waste gate, and prechamber fuel pressure to provide the best fuel efficiency at a particular operating condition which will, at the same time, maintain the NOX emissions in the engine's exhaust within limits set by the E.P.A. Further, other actual measured parameters are also used to further "fine-tune" the controlled functions to compensate for minor changes in ambient conditions and the like at the set operating conditions of unit 20.

What is claimed is:

1. In a clean-burn, turbo-charged, gaseous-fueled engine having (1) a prechamber for each cylinder of said engine in which ignition is initiated; (2) a prechamber fuel pressure regulator for controlling fuel flow to said prechamber; (3) an air chest for storing air under pressure for mixing with the fuel for the engine; (4) a turbocharger driven by the exhaust from the engine to supply air under pressure to said air chest; (5) a waste gate for controlling the amount of exhaust to said turbocharger; and (6) ignition timing means; a control system comprising:

means for measuring the speed of the engine and generating a signal representative thereof;

means for measuring the torque of said engine and generating a signal representative thereof;

control signal storage means for storing a plurality of ignition timing control signals and a plurality of waste gate control signals, each of said ignition timing control signals and each of said waste gate control signals having a predetermined value corresponding to a desired setting of said ignition timing means and said waste gate, respectively, which will produce a desired operating condition at a particular combination of engine speed and torque;

means for inputing said speed signal and said torque signal into said control signal storage means;

means for outputing a predetermined particular ignition timing control signal from said control signal storage means in response to said speed and said torque signals;

means for outputing a particular predetermined waste gate control signal from said control signal storage means in response to said speed and said torque signals;

means responsive to said particular ignition timing control signal to adjust said ignition means to a position corresponding to said predetermined particular ignition timing control signal; and means responsive to said particular predetermined waste gate control signal to adjust said waste gate to a position corresponding to said predetermined particular waste gate control signal.

2. The control system of claim 1 wherein said control signal storage means includes means for storing a plurality of prechamber fuel pressure regulator control signals; each of said prechamber fuel pressure regulator signals having a predetermined value corresponding to a desired setting of said prechamber fuel pressure regulator which will give a desired engine operation at a particular pressure in said air chest;

means to measure the pressure in said air chest and generate a signal representative thereof;

means to output a particular prechamber fuel pressure regulator signal from said second control signal storage means in response to said air chest pressure signal; and means responsive to said particular prechamber fuel pressure regulator control signal to adjust said prechamber fuel pressure regulator to a positon corresponding to the predetermined value of said particular prechamber fuel pressure regulator control signal.

3. An engine-driven compressor unit comprising:
a gaseous fueled engine having:
a prechamber for each combustion cylinder of said engine in which the ignition is initiated;
a prechamber fuel pressure regulator for controlling gaseous fuel flow to the prechamber;
an air chest for storing air under pressure for mixing with the fuel for said engine;
a turbocharger driven by the exhaust from the engine to supply said air under pressure to said air chest;
a waste gate for controlling the amount of exhaust to drive said turbocharger;
ignition timing means; and
a drive shaft;
a compressor having a driven shaft;
a flexible coupling connecting said drive shaft and said driven shaft together; and
means for continuously measuring the torque developed in said flexible coupling during operation and for generating a signal representative of said measured torque.

4. The engine-compressor unit of claim 3 including:
means for measuring the speed of the engine and generating a signal representative thereof;
control signal storage means for storing a plurality of ignition timing control signals and a plurality of waste gate control signals, each of said ignition timing control signals and each of said waste gate control signals having a predetermined value corresponding to a desired setting of said ignition timing means and said waste gate, respectively, which will produce a desired operating condition at a particular combination of engine speed and torque;
means for inputing said speed signal and said torque signal into said control signal storage means;
means for outputing a predetermined particular ignition timing control signal from said control signal storage means in response to said speed and said torque signals;
means for outputing a particular predetermined waste gate control signal from said control signal storage means in response to said speed and said torque signals;
means responsive to said particular ignition timing control signal to adjust said ignition means to a position corresponding to said predetermined particular ignition timing control signal; and
means responsive to said particular predetermined waste gate control signal to adjust said waste gate to a position corresponding to said predetermined particular waste gate control signal.

5. The control system of claim 4 including:
a second control signal storage means for storing a plurality of prechamber fuel pressure regulator control signals; each of said prechamber fuel pressure regulator signals having a predetermined value corresponding to desired setting of prechamber fuel pressure regulator which will given a desired engine operation at a particular pressure in said air chest;
means to measure the pressure in said air chest and generate a signal representative thereof;
means to output a particular prechamber fuel pressure regulator signal from said second control signal storage means in response to said air chest pressure signal; and means responsive to said particular prechamber fuel pressure regulator control signal to adjust said prechamber fuel pressure regulator to a position corresponding to the predetermined value of said particular prechamber fuel pressure regulator control signal.

6. In an engine-driven compressor unit having a compressor which is driven through a flexible coupling by a clean-burn, turbo-charged, gaseous-fueled engine having (1) a prechamber for each cylinder of said engine in which ignition is initiated; (2) a prechamber fuel pressure regulator for controlling fuel flow to said prechamber; (3) an air chest for storing air under pressure for mixing with the fuel for the engine; (4) a turbocharger driven by the exhaust from the engine to supply air under pressure to said air chest; (5) a waste gate for controlling the amount of exhaust to said turbocharger; and (6) ignition timing means; a control system comprising:

means for measuring the speed of the engine and generating a signal representative thereof;

means for measuring the torque of said engine and generating a signal representative thereof;

control signal storage means for storing a plurality of ignition timing control signals and a plurality of waste gate control signals, each of said ignition timing control signals and each of said waste gate control signals having a predetermined value corresponding to a desired setting of said ignition timing means and said waste gate, respectively, which will produce a desired operating condition at a particular combination of engine speed and torque;

means for inputing said speed signal and said torque signal into said control signal storage means;

means for outputing a predetermined particular ignition timing control signal from said control signal storage means in response to said speed and said torque signals;

means for outputing a particular predetermined waste gate control signal from said control signal storage means in response to said speed and said torque signals;

means responsive to said particular ignition timing control signal to adjust said ignition means to a position corresponding to said predetermined particular ignition timing control signal; and means responsive to said particular predetermined waste gate control signal to adjust said waste gate to a position corresponding to said predetermined particular waste gate control signal.

7. The control system of claim 6 including:

a second control signal storage means for storing a plurality of prechamber fuel pressure regulator control signals; each of said prechamber fuel pressure regulator signals having a predetermined value corresponding to desired setting of prechamber fuel pressure regulator which will give a desired engine operation at a particular pressure in said air chest;

means to measure the pressure in said air chest and generate a signal representative thereof;

means to output a particular prechamber fuel pressure regulator signal from said second control signal storage means in response to said air chest pressure signal; and means responsive to said particular prechamber fuel pressure regulator control signal to adjust said prechamber fuel presure regulator to a position corresponding to the predetermined value of said particular prechamber fuel pressure regulator control signal.

8. A method for controlling a clean-burn, turbo-charged, gaseous-fueled engine, said method comprising:

measuring the speed of said engine and generating a signal representative of said speed;

measuring the torque being generated by said engine and generating a signal representative of said torque;

applying speed signal and said torque signal to a control signal storage means;

storing in said control signal storage means a plurality of ignition timing control signals for said engine and a plurality of waste gate control signals for said engine, each of said ignition timing signals and said waste gate signals having a respective predetermined value corresponding to a desired setting of the ignition timing means and said waste gate, respectively, which, in turn, will provide a desired engine operation at particular combination of engine speed and torque;

outputing a particular predetermined ignition timing control signal and a particular predetermined waste gate control signal from said control signal storage means in response to said measured speed signal and said measured torque signal;

adjusting the ignition timing of said engine in response to said predetermined ignition control signal; and adjusting the waste gate of said engine in response to said predetermined waste gate control signal.

* * * * *